US012347943B2

(12) United States Patent
Tsuchiya et al.

(10) Patent No.: US 12,347,943 B2
(45) Date of Patent: Jul. 1, 2025

(54) MULTIBAND ANTENNA

(71) Applicant: JAPAN AVIATION ELECTRONICS INDUSTRY, LIMITED, Tokyo (JP)

(72) Inventors: Kenta Tsuchiya, Tokyo (JP); Hiroshi Toyao, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 91 days.

(21) Appl. No.: 17/719,505

(22) Filed: Apr. 13, 2022

(65) Prior Publication Data

US 2022/0376400 A1 Nov. 24, 2022

(30) Foreign Application Priority Data

May 19, 2021 (JP) ................................ 2021-084571

(51) Int. Cl.
*H01Q 5/364* (2015.01)
*H01Q 1/36* (2006.01)
*H01Q 13/10* (2006.01)

(52) U.S. Cl.
CPC ............... *H01Q 5/364* (2015.01); *H01Q 1/36* (2013.01); *H01Q 13/10* (2013.01)

(58) Field of Classification Search
CPC ...... H01Q 1/2258; H01Q 1/2266; H01Q 1/36; H01Q 1/38; H01Q 1/243; H01Q 5/342;
(Continued)

(56) References Cited

U.S. PATENT DOCUMENTS 9,196,952 B2 11/2015 Tran et al.
2004/0140938 A1 7/2004 Kadambi et al.
(Continued)

FOREIGN PATENT DOCUMENTS

JP 2012085262 A 4/2012
JP 2012182632 A 9/2012
(Continued)

OTHER PUBLICATIONS

Korean Office Action (and an English language translation thereof) dated Jul. 29, 2023, issued in counterpart Korean Application No. 10-2022-0045746.

(Continued)

*Primary Examiner* — Robert Karacsony
(74) *Attorney, Agent, or Firm* — Holtz, Holtz & Volek PC

(57) ABSTRACT

A multiband antenna is connected to a host conductor when used. The multiband antenna extends long in a first direction. The multiband antenna has a conductor main portion and a ground terminal. The conductor main portion extends in a horizontal plane which is defined by the first direction and a second direction perpendicular to the first direction. The conductor main portion is formed with an opening and a slot. The slot extends long in the first direction. The conductor main portion has a first short edge, a second short edge, a first long edge and a second long edge. The ground terminal is connected to the host conductor when the multiband antenna is used. The ground terminal extends from the second long edge. The ground terminal is positioned closer to the first short edge than to the second short edge in the first direction.

10 Claims, 9 Drawing Sheets

(58) Field of Classification Search
CPC ........ H01Q 5/357; H01Q 5/364; H01Q 5/371; H01Q 9/0421; H01Q 9/42; H01Q 13/10; H01Q 13/103; H01Q 13/16; H01Q 21/30; H01Q 1/2256; H01Q 5/314; H01Q 5/321; H01Q 9/0442; H01Q 9/045
See application file for complete search history.

(56) References Cited

U.S. PATENT DOCUMENTS

| | | | | |
|---|---|---|---|---|
| 2007/0018892 | A1 | 1/2007 | Ku et al. | |
| 2010/0214181 | A1 | 8/2010 | Ryou et al. | |
| 2011/0043427 | A1 | 2/2011 | Lee et al. | |
| 2011/0291895 | A1 | 12/2011 | Zaila et al. | |
| 2012/0050134 | A1* | 3/2012 | Wu | H01Q 13/16 343/908 |
| 2012/0162023 | A1* | 6/2012 | Tai | H01Q 5/378 343/700 MS |
| 2014/0266920 | A1 | 9/2014 | Tran et al. | |

FOREIGN PATENT DOCUMENTS

| | | | |
|---|---|---|---|
| JP | 2016517670 | A | 6/2016 |
| KR | 20080097824 | A | 11/2008 |
| KR | 20130108775 | A | 10/2013 |
| TW | 200913386 | A | 3/2009 |
| TW | M383213 | U | 6/2010 |
| TW | M435737 | U | 8/2012 |

OTHER PUBLICATIONS

European Office Action dated Jun. 16, 2023 issued in counterpart European Application No. 22 167 251.2.

Taiwanese Office Action dated Apr. 12, 2023 (and English translation thereof) issued in counterpart Taiwanese Application No. 111 113 624.

Extended European Search Report (EESR) dated Sep. 30, 2022, issued in counterpart European Application No. 22167251.2.

Chinese Office Action (and an English language translation thereof) dated Mar. 1, 2025, issued in counterpart Chinese Application No. 202210384433.6.

* cited by examiner

MULTIBAND ANTENNA

CROSS REFERENCE TO RELATED APPLICATIONS

This application is based on and claims priority under 35 U.S.C. § 119 to Japanese Patent Application No. JP2021-084571 filed May 19, 2021, the contents of which are incorporated herein in their entirety by reference.

BACKGROUND OF THE INVENTION

This invention relates to a multiband antenna which is connected to a host conductor when used.

Referring to FIG. 17, a multiband antenna 900 of JPA2012-85262 (Patent Document 1) comprises a conductive plate 910, or a conductor main portion 910. The conductor main portion 910 is formed with two openings 912 and two slots 914. Each of the slots 914 extends long in a Y-direction.

A multiband antenna such as the multiband antenna of Patent Document 1 is required to provide good antenna characteristics and to be further downsized.

SUMMARY OF THE INVENTION

It is therefore an object of the present invention to provide a multiband antenna which provides good antenna characteristics and can be further downsized.

One aspect of the present invention provides a multiband antenna which is connected to a host conductor when used. The multiband antenna extends long in a first direction. The multiband antenna has a conductor main portion and a ground terminal. The conductor main portion extends in a horizontal plane which is defined by the first direction and a second direction perpendicular to the first direction. The conductor main portion is formed with an opening and a slot. The slot extends long in the first direction. The conductor main portion has a first short edge, a second short edge, a first long edge and a second long edge. The first short edge and the second short edge are positioned at opposite ends, respectively, of the conductor main portion in the first direction. The first long edge and the second long edge are positioned at opposite ends, respectively, of the conductor main portion in the second direction. The opening is formed at the first short edge and connects the slot with an outside of the conductor main portion in the first direction. The ground terminal is connected to the host conductor when the multiband antenna is used. The ground terminal extends from the second long edge. The ground terminal is positioned closer to the first short edge than to the second short edge in the first direction.

In the multiband antenna of the present invention, the ground terminal is connected to the host conductor when the multiband antenna is used. Thus, the multiband antenna of the present invention alone can be downsized by utilizing the host conductor, which is an external component and is connected with the ground terminal, as a part of a multiband antenna.

In the multiband antenna of the present invention, the ground terminal extends from the second long edge. This enables the multiband antenna of the present invention to obtain high radiation efficiency.

In the multiband antenna of the present invention, the ground terminal is positioned closer to the first short edge than to the second short edge in the first direction. Thus, the multiband antenna of the present invention can have a low resonant frequency without upsizing the multiband antenna alone.

An appreciation of the objectives of the present invention and a more complete understanding of its structure may be had by studying the following description of the preferred embodiment and by referring to the accompanying drawings.

Figure 1:
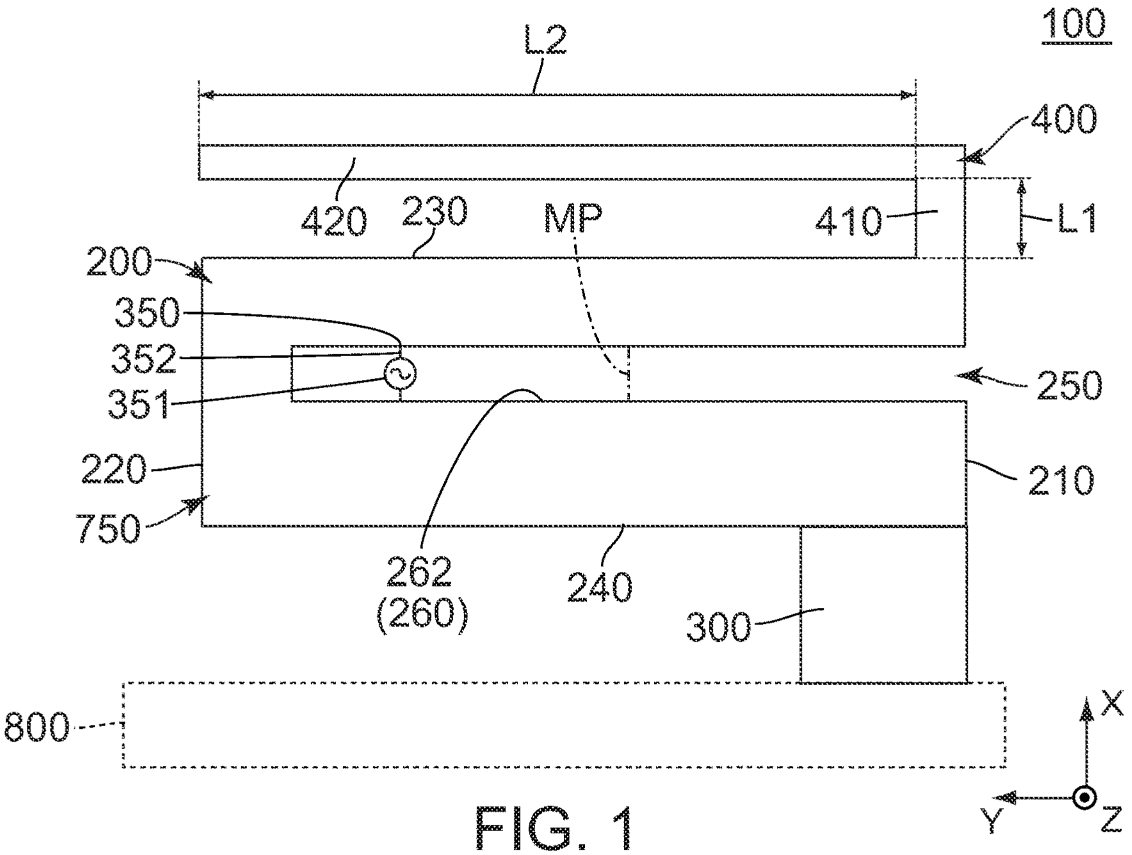
FIG. 1 is a top view showing a multiband antenna according to a first embodiment of the present invention. In the figure, a host conductor is illustrated by broken line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Referring to FIG. 1, a multiband antenna 100 according to a first embodiment of the present invention is partially made of a metal plate 750. However, the present invention is not limited thereto. Specifically, the whole of the multiband antenna 100 may be made of the metal plate 750. As shown in FIG. 1. the multiband antenna 100 of the present embodiment is connected to a host conductor 800 when used. In the present embodiment, the host conductor 800 is, for example, a metal housing of a device, in which the multiband antenna 100 is placed, or a ground trace on a printed circuit board, such as a motherboard, which is distinct and separated from the multiband antenna 100.

Referring to FIG. 1, the multiband antenna 100 has a plurality of operating frequencies. The multiband antenna 100 extends long in a first direction. In the present embodiment, the first direction is a Y-direction. In addition, the first direction is also referred to as a right-left direction. Specifically, it is assumed that rightward is a positive Y-direction while leftward is a negative Y-direction.

As shown in FIG. 1, the multiband antenna 100 has a conductor main portion 200 and a ground terminal 300. Referring to FIG. 1, the multiband antenna 100 has no supporting member which supports the conductor main portion 200. However, the present invention is not limited thereto. Specifically, if the conductor main portion 200 has low strength because, for example, the conductor main portion 200 is thin, the multiband antenna 100 may have a supporting member which supports the conductor main portion 200.

Referring to FIG. 1, the conductor main portion 200 of the present embodiment is made of the metal plate 750. The conductor main portion 200 extends in a horizontal plane which is defined by the first direction and a second direction perpendicular to the first direction. In the present embodiment, the second direction is an X-direction. In addition, the second direction is also referred to as a front-rear direction. Specifically, it is assumed that forward is a positive X-direction while rearward is a negative X-direction. In other words, the conductor main portion 200 extends in the horizontal plane perpendicular to a perpendicular direction which is perpendicular to both the first direction and the second direction. In the present embodiment, the perpendicular direction is a Z-direction. Specifically, it is assumed that upward is a positive Z-direction while downward is a negative Z-direction. In addition, the horizontal plane of the present embodiment is an XY-plane.

As shown in FIG. 1, the conductor main portion 200 has a first short edge 210, a second short edge 220, a first long edge 230 and a second long edge 240.

As shown in FIG. 1, each of the first short edge 210 and the second short edge 220 of the present embodiment extends in the second direction. Each of the first short edge 210 and the second short edge 220 has a linear shape. However, the present invention is not limited. The first short edge 210 may have a shape other than the linear shape, and the second short edge 220 may have a shape other than the linear shape. The first short edge 210 and the second short edge 220 are positioned at opposite ends, respectively, of the conductor main portion 200 in the first direction.

Figure 2:
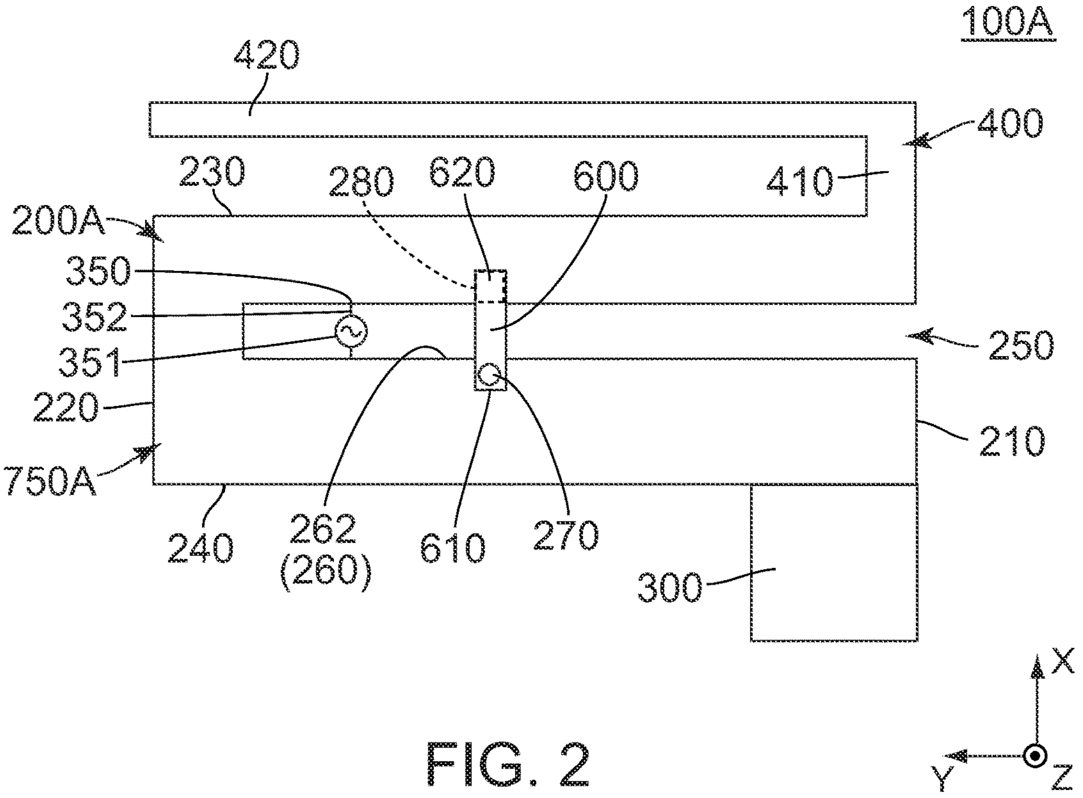
FIG. 2 is a top view showing a first modification of the multiband antenna of FIG. 1.

As shown in FIG. 2, each of the first long edge 230 and the second long edge 240 of the present embodiment extends in the first direction. Each of the first long edge 230 and the second long edge 240 has a linear shape. However, the present invention is not limited. The first long edge 230 may have a shape other than the linear shape, and the second long edge 240 may have a shape other than the linear shape. The first long edge 230 and the second long edge 240 are positioned at opposite ends, respectively, of the conductor main portion 200 in the second direction.

As shown in FIG. 1, the conductor main portion 200 is formed with an opening 250 and a slot 260.

As shown in FIG. 1, the opening 250 of the present embodiment is formed at the first short edge 210. The opening 250 connects the slot 260 with the outside of the conductor main portion 200 in the first direction.

As shown in FIG. 1, the slot 260 of the present embodiment extends long in the first direction. The slot 260 has an inner edge 262.

Referring to FIG. 1, the ground terminal 300 of the present embodiment is a copper tape. However, the present embodiment is not limited thereto. Specifically, the ground terminal 300 may be made of the metal plate 750. The ground terminal 300 is connected to the host conductor 800 when the multiband antenna 100 is used. The ground terminal 300 extends from the second long edge 240. The ground terminal 300 is positioned closer to the first short edge 210 than to the second short edge 220 in the first direction. Specifically, the ground terminal 300 is positioned closer to the opening 250 than to a midpoint MP of the slot 260 in the first direction. More specifically, the ground terminal 300 extends so as to be continuous with the first short edge 210. However, the present invention is not limited thereto. Specifically, the multiband antenna 100 should be configured so that the ground terminal 300 extends so as to be, at least in part, continuous with the first short edge 210. This configuration enables the multiband antenna 100 to have a low resonant frequency. This also means that, if the multiband antenna 100 with this configuration and a multiband antenna without this configuration have the same resonant frequency, the multiband antenna 100 with this configuration has a size smaller than a size of the multiband antenna without this configuration.

Figure 4:
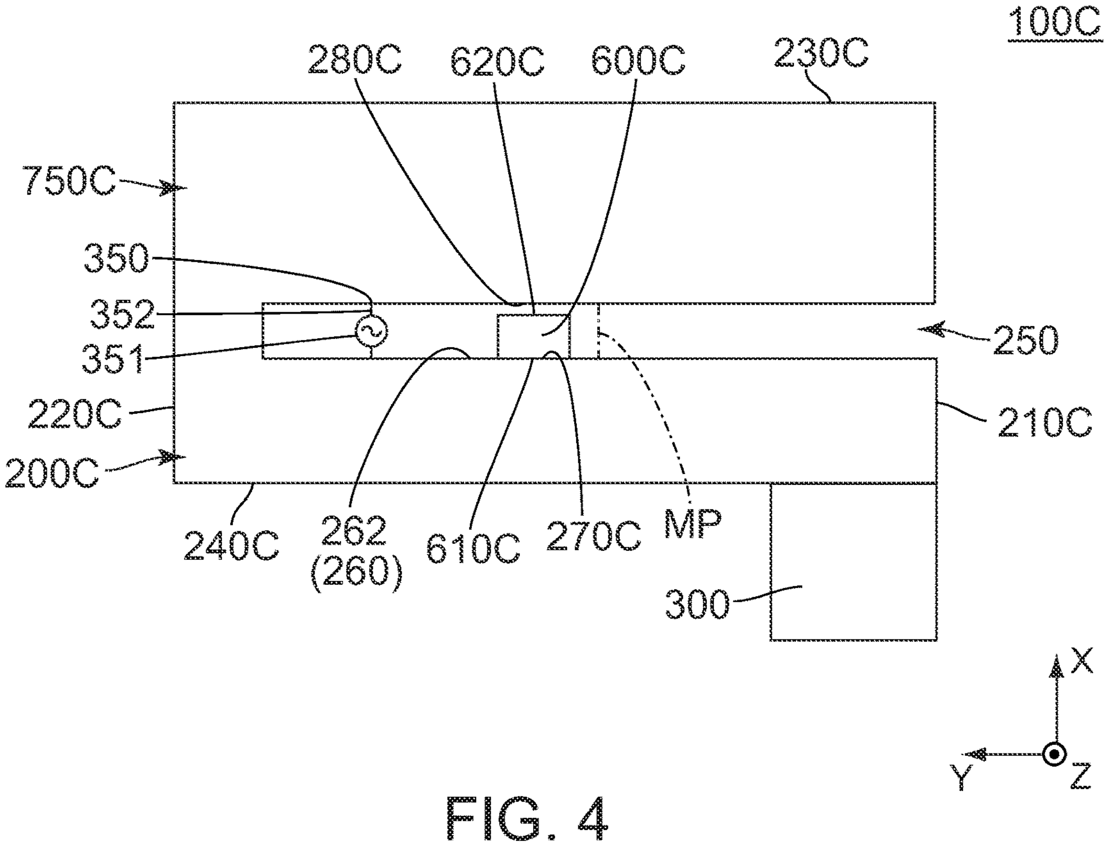
FIG. 4 is a top view showing a third modification of the multiband antenna of FIG. 1.

As shown in FIG. 4, the multiband antenna 100 of the present embodiment further comprises a radiation element 400. However, the present embodiment is not limited thereto. Specifically, the multiband antenna 100 may comprise no radiation element 400.

Referring to FIG. 1, the radiation element 400 of the present embodiment is made of the metal plate 750. An electrical length of the radiation element 400 is defined with reference to one-fourth of a wavelength of one of the operating frequencies of the multiband antenna 100. In other words, the electrical length of the radiation element 400 corresponds to one-fourth of a wavelength of any one of the operating frequencies of the multiband antenna 100. The radiation element 400 has a first portion 410 and a second portion 420.

As shown in FIG. 1, the first portion 410 of the present embodiment extends from the conductor main portion 200 so as to be apart from the slot 260 in the second direction. More specifically, the first portion 410 extends forward from the first long edge 230 of the conductor main portion 200 in the front-rear direction. The first portion 410 has a flat-plate shape which extends linearly in the second direction from the first long edge 230 of the conductor main portion 200. The first portion 410 has a first length L1 in the second direction.

As shown in FIG. 1, the second portion 420 of the present embodiment extends in the first direction from the first portion 410. More specifically, the second portion 420 extends rightward in the right-left direction from the first portion 410. The second portion 420 has a flat-plate shape which extends linearly in the first direction. The second portion 420 has a second length L2 in the first direction. The second length L2 is greater than the first length L1.

As shown in FIG. 1, the multiband antenna 100 of the present embodiment comprises a feed point 350. The feed point 350 is positioned rightward in the right-left direction beyond the midpoint MP. The feed point 350 is connected with the conductor main portion 200 across the slot 260.

High frequency electrical power is supplied to the feed point 350 from a high frequency power source 351 via a feed line 352. An electrical connecting method between the feed point 350 and the feed line 352 is not particularly limited. For example, the feed line 352 may be directly connected to the feed point 350 by soldering or the like. Alternatively, the feed point 350 may be located near a part of the feed line 352 with an interval left therebetween to be connected capacitively or electromagnetically. At any rate, the feed point 350 and the feed line 352 should be electrically connected to each other so that the feed point 350 is supplied with electrical power from the feed line 352.

As described above, the feed point 350 is connected with the conductor main portion 200 across the slot 260. This enables the slot 260 to work as a feed antenna. Although the feed point 350 is not placed in close proximity to the radiation element 400, electrical power is indirectly supplied to the radiation element 400 from the feed point 350. Thus, the radiation element 400 works as an unpowered antenna.

While the first embodiment of the present invention is described above, the present embodiment may be modified as follows.

First Modification

Referring to FIG. 2, a multiband antenna 100A according to a first modification is partially made of a metal plate 750A. However, the present invention is not limited thereto. Specifically, the whole of the multiband antenna 100A may be made of the metal plate 750A. The multiband antenna 100A of the present modification is connected to a host conductor (not shown) when used.

Referring to FIG. 2, the multiband antenna 100A has a plurality of operating frequencies. The multiband antenna 100A extends long in the first direction.

As shown in FIG. 2, the multiband antenna 100A of the present modification has a conductor main portion 200A, a ground terminal 300 and a radiation element 400. Referring to FIG. 2, the multiband antenna 100A has no supporting member which supports the conductor main portion 200A. However, the present invention is not limited thereto. Specifically, if the conductor main portion 200A has low strength because, for example, the conductor main portion 200A is thin, the multiband antenna 100A may have a supporting member which supports the conductor main portion 200A.

Referring to FIG. 2, the conductor main portion 200A of the present modification is made of the metal plate 750A. The conductor main portion 200A has a connection portion 270 and an opposed portion 280.

As shown in FIG. 2, in the second direction, or in the front-rear direction, the connection portion 270 of the present modification is farther away from the radiation element 400 than the opposed portion 280 is. The connection portion 270 is positioned rearward of the opposed portion 280 in the front-rear direction. The connection portion 270 and the opposed portion 280 are positioned so that a slot 260 is put between the connection portion 270 and the opposed portion 280 in the second direction, or in the front-rear direction.

As shown in FIG. 2, the multiband antenna 100A further comprises a stub 600.

Referring to FIG. 2, the stub 600 of the present modification is a so-called open stub. The stub 600 corresponds to the slot 260. In other words, the multiband antenna 100A further comprises the stub 600 which corresponds to the slot 260. The stub 600 is positioned away from an opening 250 in the first direction. Specifically, the stub 600 is positioned rightward of and away from the opening 250 in the right-left direction. An electrical length of the stub 600 is less than one-fourth of a wavelength of any one of the operating frequencies of the multiband antenna 100A. The stub 600 has a flat-plate shape extending in the second direction, or in the front-rear direction. However, the present invention is not limited thereto. The stub 600 may be shaped in meander, spiral or irregularly meandering form. The stub 600 has a first end 610 and a second end 620 in the second direction, or in the front-rear direction. The first end 610 is positioned rearward of the second end 620 in the front-rear direction. The first end 610 of the stub 600 is connected with the connection portion 270. The second end 620 of the stub 600 is spaced apart from the opposed portion 280 and faces the opposed portion 280. Specifically, the second end 620 of the stub 600 is spaced apart from the opposed portion 280 and faces the opposed portion 280 in a plane which includes the second direction, or the front-rear direction. More specifically, the second end 620 of the stub 600 is spaced apart from the opposed portion 280 and faces the opposed portion 280 in the perpendicular direction. In other words, the second end 620 of the stub 600 is an open end.

Referring to FIG. 2, the multiband antenna 100A of the present modification is configured so that an adjustment of a relative position of the stub 600 with respect to the slot 260 in the first direction, or in the right-left direction, can adjust frequencies of higher resonance modes, such as a second resonance mode, which are provided in the slot 260. Since the stub 600 is positioned away from the opening 250 in the first direction as described above, the stub 600 hardly has an effect on a resonant frequency of a first resonance mode which is provided in the first slot 260.

As described above, the multiband antenna 100A of the present modification is configured so that the first end 610 of the stub 600 is connected with the connection portion 270 while the second end 620 of the stub 600 is spaced apart from the opposed portion 280 and faces the opposed portion 280. However, the present invention is not limited thereto. Specifically, the multiband antenna 100A of the present modification may be modified as follows: the first end 610 of the stub 600 is spaced apart from the connection portion 270 and faces the connection portion 270; and the second end 620 of the stub 600 is connected with the opposed portion 280.

As shown in FIG. 2, the multiband antenna 100A of the present modification comprises a feed point 350. The feed point 350 is positioned rightward in the right-left direction beyond a midpoint MP. The feed point 350 is connected with the conductor main portion 200A across the slot 260. High frequency electrical power is supplied to the feed point 350 from a high frequency power source 351 via a feed line 352.

Second Modification

Figure 3:
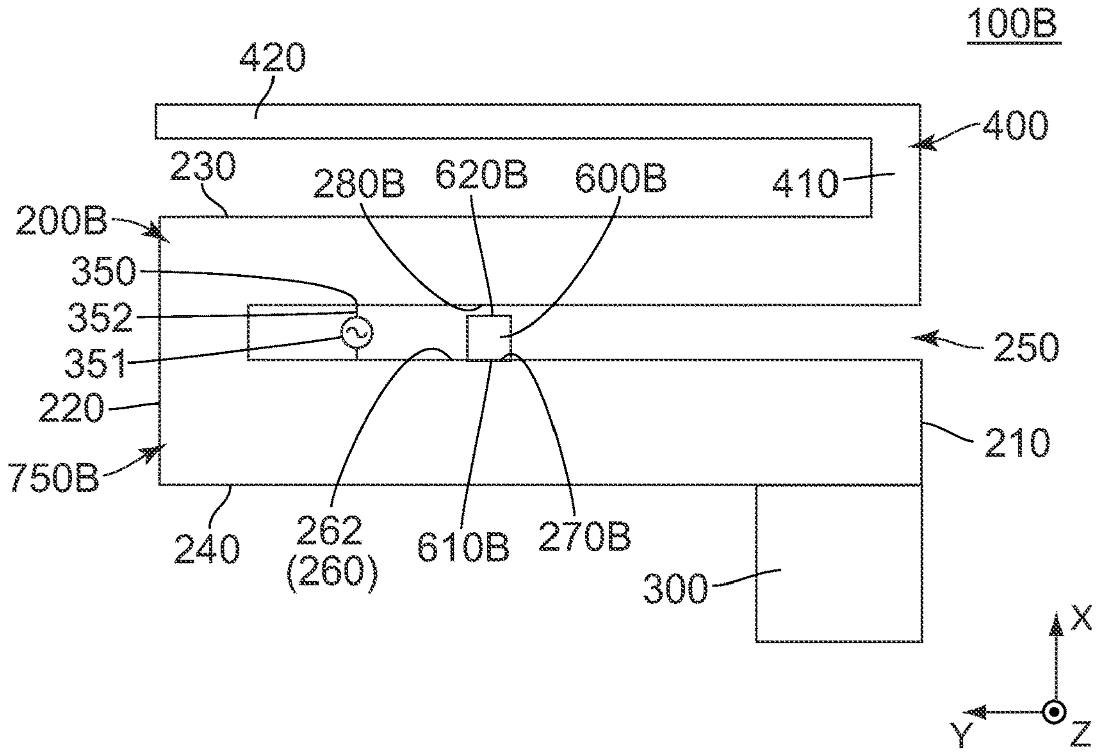
FIG. 3 is a top view showing a second modification of the multiband antenna of FIG. 1.

Referring to FIG. 3, a multiband antenna 1008 according to a second modification is partially made of a metal plate 750B. However, the present invention is not limited thereto. Specifically, the whole of the multiband antenna 1008 may be made of the metal plate 750B. The multiband antenna 1008 of the present modification is connected to a host conductor (not shown) when used.

Referring to FIG. 3, the multiband antenna 1008 has a plurality of operating frequencies. The multiband antenna 1008 extends long in the first direction.

As shown in FIG. 3, the multiband antenna 1008 of the present modification has a conductor main portion 200B, a ground terminal 300 and a radiation element 400. Referring to FIG. 3, the multiband antenna 100B has no supporting member which supports the conductor main portion 200B. However, the present invention is not limited thereto. Specifically, if the conductor main portion 200B has low strength because, for example, the conductor main portion 200B is thin, the multiband antenna 1008 may have a supporting member which supports the conductor main portion 200B.

Referring to FIG. 3, the conductor main portion 200B of the present modification is made of the metal plate 750B. The conductor main portion 200B has a connection portion 270B and an opposed portion 280B.

As shown in FIG. 3, in the second direction, or in the front-rear direction, the connection portion 270B of the present modification is farther away from the radiation element 400 than the opposed portion 280B is. The connection portion 270B is positioned rearward of the opposed portion 280B in the front-rear direction. The connection portion 270B and the opposed portion 280B are positioned so that a slot 260 is put between the connection portion 270B and the opposed portion 280B in the second direction, or in the front-rear direction.

As shown in FIG. 3, the multiband antenna 1008 further comprises a stub 600B.

Referring to FIG. 3, the stub 600B of the present modification is a so-called open stub. The stub 600B corresponds to the slot 260. In other words, the multiband antenna 1008 further comprises the stub 600B which corresponds to the slot 260. The stub 600B is positioned away from an opening 250 in the first direction. Specifically, the stub 600B is positioned rightward of and away from the opening 250 in the right-left direction. An electrical length of the stub 600B is less than one-fourth of a wavelength of any one of the operating frequencies of the multiband antenna 1008. The stub 600B has a flat-plate shape extending in the second direction, or in the front-rear direction. However, the present invention is not limited thereto. The stub 600B may be shaped in meander, spiral or irregularly meandering form. The stub 600B has a first end 6108 and a second end 620B in the second direction, or in the front-rear direction. The first end 6108 is positioned rearward of the second end 620B in the front-rear direction. The first end 6108 of the stub 600B is connected with the connection portion 270B. The second end 620B of the stub 600B is spaced apart from the opposed portion 280B and faces the opposed portion 280B. Specifically, the second end 620B of the stub 600B is spaced apart from the opposed portion 280B and faces the opposed portion 280B in a plane which includes the second direction, or the front-rear direction. More specifically, the second end 620B of the stub 600B is spaced apart from the opposed portion 280B and faces the opposed portion 280B in the front-rear direction. In other words, the second end 620B of the stub 600B is an open end.

Referring to FIG. 3, the multiband antenna 1008 of the present modification is configured so that an adjustment of a relative position of the stub 600B with respect to the slot 260 in the first direction, or in the right-left direction, can adjust frequencies of higher resonance modes, such as a second resonance mode, which are provided in the slot 260. Since the stub 600B is positioned away from the opening 250 in the first direction as described above, the stub 600B has little effect on a resonant frequency of a first resonance mode which is provided in the first slot 260.

As described above, the multiband antenna 1008 of the present modification is configured so that the first end 6108 of the stub 600B is connected with the connection portion 270B while the second end 620B of the stub 600B is spaced apart from the opposed portion 280B and faces the opposed portion 280B. However, the present invention is not limited thereto. Specifically, the multiband antenna 100B of the present modification may be modified as follows: the first end 6108 of the stub 600B is spaced apart from the connection portion 270B and faces the connection portion 270B; and the second end 620B of the stub 600B is connected with the opposed portion 280B.

As shown in FIG. 3, the multiband antenna 1008 of the present modification comprises a feed point 350. The feed point 350 is positioned rightward in the right-left direction beyond a midpoint MP. The feed point 350 is connected with the conductor main portion 200B across the slot 260. High frequency electrical power is supplied to the feed point 350 from a high frequency power source 351 via a feed line 352.

Third Modification

Referring to FIG. 4, a multiband antenna 100C according to a third modification is partially made of a metal plate 750C. However, the present invention is not limited thereto. Specifically, the whole of the multiband antenna 100C may be made of the metal plate 750C. The multiband antenna 100C of the present modification is connected to a host conductor (not shown) when used.

Referring to FIG. 4, the multiband antenna 100C has a plurality of operating frequencies. The multiband antenna 100C extends long in the first direction.

As shown in FIG. 4, the multiband antenna 100C of the present modification has a conductor main portion 200C and a ground terminal 300. Referring to FIGS. 3 and 4, dissimilar to the multiband antenna 1008 of the second modification, the multiband antenna 100C of the present modification has no radiation element 400. Referring to FIG. 4, the multiband antenna 100C has no supporting member which supports the conductor main portion 200C. However, the present invention is not limited thereto. Specifically, if the conductor main portion 200C has low strength because, for example, the conductor main portion 200C is thin, the multiband antenna 100C may have a supporting member which supports the conductor main portion 200C.

Referring to FIG. 4, the conductor main portion 200C of the present modification is made of the metal plate 750C. The conductor main portion 200C extends in the horizontal plane which is defined by the first direction and the second direction perpendicular to the first direction. In other words, the conductor main portion 200C extends in the horizontal plane perpendicular to the perpendicular direction which is perpendicular to both the first direction and the second direction.

As shown in FIG. 4, the conductor main portion 200C has a first short edge 210C, a second short edge 220C, a first long edge 230C and a second long edge 240C.

As shown in FIG. 4, each of the first short edge 210C and the second short edge 220C of the present modification extends in the second direction. Each of the first short edge 210C and the second short edge 220C has a linear shape. However, the present invention is not limited. The first short edge 210C may have a shape other than the linear shape, and the second short edge 220C may have a shape other than the linear shape. The first short edge 210C and the second short edge 220C are positioned at opposite ends, respectively, of the conductor main portion 200C in the first direction.

As shown in FIG. 4, each of the first long edge 230C and the second long edge 240C of the present modification extends in the first direction. Each of the first long edge 230C and the second long edge 240C has a linear shape.

However, the present invention is not limited. The first long edge 230C may have a shape other than the linear shape, and the second long edge 240C may have a shape other than the linear shape. The first long edge 230C and the second long edge 240C are positioned at opposite ends, respectively, of the conductor main portion 200C in the second direction.

As shown in FIG. 4, the conductor main portion 200C is formed with an opening 250 and a slot 260.

Referring to FIG. 4, the conductor main portion 200C of the present modification has a connection portion 270C and an opposed portion 280C. The connection portion 270C and the opposed portion 280C of the present modification have structures similar to those of the connection portion 270B and the opposed portion 280B of the second modification. Accordingly, a detailed explanation thereabout is omitted.

As shown in FIG. 4, the ground terminal 300 of the present modification extends from the second long edge 240C. The ground terminal 300 is positioned closer to the first short edge 210C than to the second short edge 220C in the first direction. Specifically, the ground terminal 300 is positioned closer to the opening 250 than to a midpoint MP of the slot 260 in the first direction. More specifically, the ground terminal 300 extends so as to be continuous with the first short edge 210C. However, the present invention is not limited thereto. Specifically, the multiband antenna 100C should be configured so that the ground terminal 300 extends so as to be, at least in part, continuous with the first short edge 210C. This configuration enables the multiband antenna 100C to have a low resonant frequency. This also means that, if the multiband antenna 100C with this configuration and a multiband antenna without this configuration have the same resonant frequency, the multiband antenna 100C with this configuration has a size smaller than a size of the multiband antenna without this configuration.

As shown in FIG. 4, the multiband antenna 100C further comprises a stub 600C. The stub 600C has a first end 610C and a second end 620C in the second direction, or in the front-rear direction. The stub 600C of the present modification has a structure similar to that of the stub 600B of the second modification. Accordingly, a detailed explanation thereabout is omitted.

As shown in FIG. 4, the multiband antenna 100C of the present modification comprises a feed point 350. The feed point 350 is positioned rightward in the right-left direction beyond the midpoint MP. The feed point 350 is connected with the conductor main portion 200C across the slot 260. High frequency electrical power is supplied to the feed point 350 from a high frequency power source 351 via a feed line 352.

Fourth Modification

Figure 5:
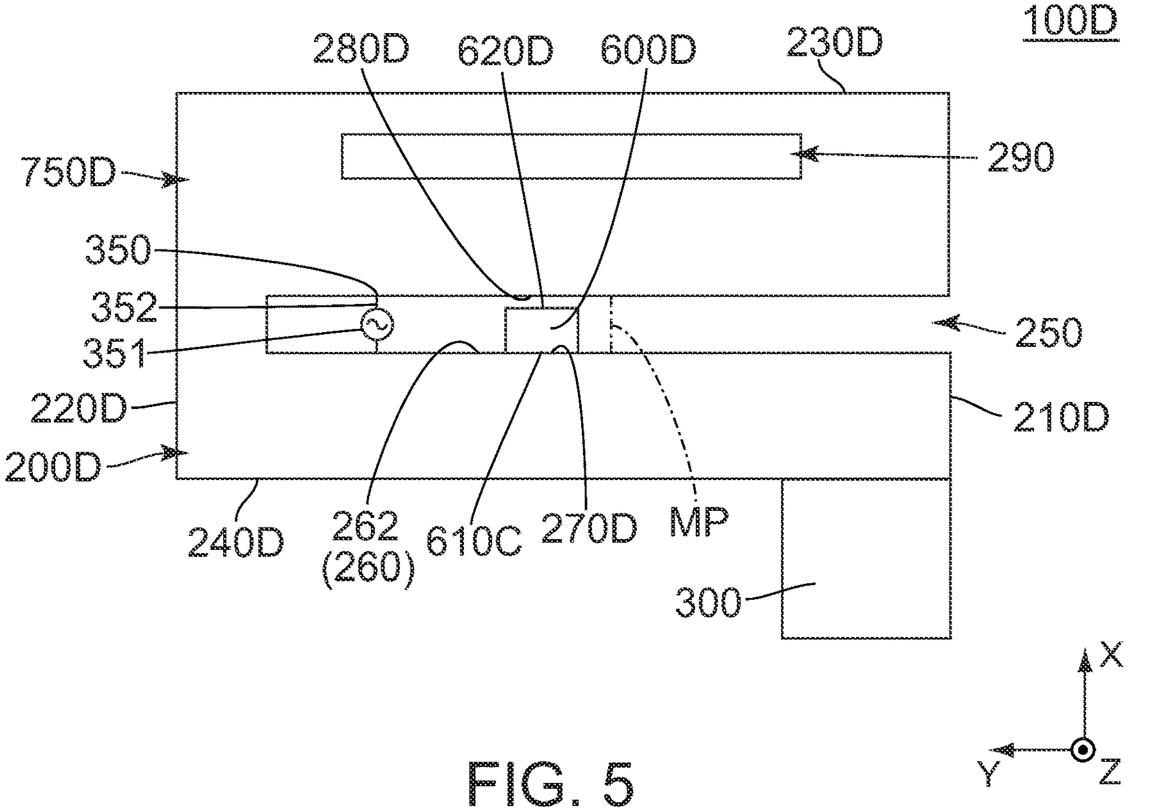
FIG. 5 is a top view showing a fourth modification of the multiband antenna of FIG. 1.

Referring to FIG. 5, a multiband antenna 100D according to a fourth modification is partially made of a metal plate 750D. However, the present invention is not limited thereto. Specifically, the whole of the multiband antenna 100D may be made of the metal plate 750D. The multiband antenna 100D of the present modification is connected to a host conductor (not shown) when used.

Referring to FIG. 5, the multiband antenna 100D has a plurality of operating frequencies. The multiband antenna 100D extends long in the first direction.

As shown in FIG. 5, the multiband antenna 100D of the present modification has a conductor main portion 200D and a ground terminal 300. Referring to FIG. 5, the multiband antenna 100D has no supporting member which supports the conductor main portion 200D. However, the present invention is not limited thereto. Specifically, if the conductor main portion 200D has low strength because, for example, the conductor main portion 200D is thin, the multiband antenna 100D may have a supporting member which supports the conductor main portion 200D.

Referring to FIG. 5, the conductor main portion 200D of the present modification is made of the metal plate 750D. The conductor main portion 200D extends in the horizontal plane which is defined by the first direction and the second direction perpendicular to the first direction. In other words, the conductor main portion 200D extends in the horizontal plane perpendicular to the perpendicular direction which is perpendicular to both the first direction and the second direction.

As shown in FIG. 5, the conductor main portion 200D has a first short edge 210D, a second short edge 220D, a first long edge 230D and a second long edge 240D.

As shown in FIG. 5, each of the first short edge 210D and the second short edge 220D of the present modification extends in the second direction. Each of the first short edge 210D and the second short edge 220D has a linear shape. However, the present invention is not limited. The first short edge 210D may have a shape other than the liner shape, and the second short edge 220D may have a shape other than the liner shape. The first short edge 210D and the second short edge 220D are positioned at opposite ends, respectively, of the conductor main portion 200D in the first direction.

As shown in FIG. 5, each of the first long edge 230D and the second long edge 240D of the present modification extends in the first direction. Each of the first long edge 230D and the second long edge 240D has a linear shape. However, the present invention is not limited. The first long edge 230D may have a shape other than the liner shape, and the second long edge 240D may have a shape other than the liner shape. The first long edge 230D and the second long edge 240D are positioned at opposite ends, respectively, of the conductor main portion 200D in the second direction.

As shown in FIG. 5, the conductor main portion 200D is formed with an opening 250, a slot 260 and an additional slot 290.

As shown in FIG. 5, the additional slot 290 of the present modification extends long in the first direction. The additional slot 290 does not communicate with the outside of the conductor main portion 200D. The additional slot 290 is positioned forward in the front-rear direction beyond the slot 260. However, the present invention is not limited thereto. Specifically, the additional slot 290 may be provided at any position on the conductor main portion 200D.

Referring to FIG. 5, the conductor main portion 200D of the present modification has a connection portion 270D and an opposed portion 280D. The connection portion 270D and the opposed portion 280D of the present modification have structures similar to those of the connection portion 270B and the opposed portion 280B of the second modification. Accordingly, a detailed explanation thereabout is omitted.

As shown in FIG. 5, the ground terminal 300 of the present modification extends from the second long edge 240D. The ground terminal 300 is positioned closer to the first short edge 210D than to the second short edge 220D in the first direction. Specifically, the ground terminal 300 is positioned closer to the opening 250 than to a midpoint MP of the slot 260 in the first direction. More specifically, the ground terminal 300 extends so as to be continuous with the first short edge 210D. However, the present invention is not limited thereto. Specifically, the multiband antenna 100D should be configured so that the ground terminal 300 extends so as to be, at least in part, continuous with the first short edge 210D. This configuration enables the multiband antenna 100D to have a low resonant frequency. This also means that, if the multiband antenna 100D with this configuration and a multiband antenna without this configuration have the same resonant frequency, the multiband antenna 100D with this configuration has a size smaller than a size of the multiband antenna without this configuration.

As shown in FIG. 5, the multiband antenna 100D further comprises a stub 600D. The stub 600D has a first end 610D and a second end 620D in the second direction, or in the front-rear direction. The stub 600D of the present modification has a structure similar to that of the stub 600B of the second modification. Accordingly, a detailed explanation thereabout is omitted.

As shown in FIG. 5, the multiband antenna 100D of the present modification comprises a feed point 350. The feed point 350 is positioned rightward in the right-left direction beyond the midpoint MP. The feed point 350 is connected with the conductor main portion 200D across the slot 260. High frequency electrical power is supplied to the feed point 350 from a high frequency power source 351 via a feed line 352. Although the feed point 350 is not placed in close proximity to the additional slot 290, electrical power is indirectly supplied to the additional slot 290 from the feed point 350. Thus, the additional slot 290 works as an unpowered antenna.

Second Embodiment

Figure 6:
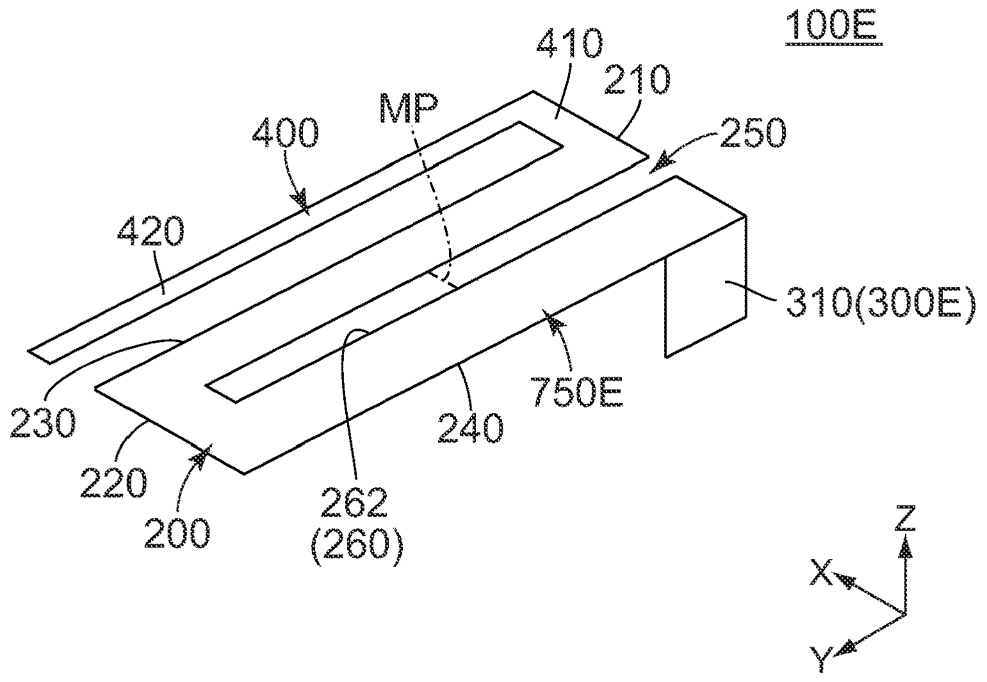
FIG. 6 is a perspective, schematic view showing a multiband antenna according to a second embodiment of the present invention.

Referring to FIG. 6, a multiband antenna 100E according to a second embodiment of the present invention is partially made of a metal plate 750E. However, the present invention is not limited thereto. Specifically, the whole of the multiband antenna 100E may be made of the metal plate 750E. The multiband antenna 100E is connected to a host conductor (not shown) when used. In the present embodiment, the host conductor is, for example, a metal housing of a device in which the multiband antenna 100E is placed. The multiband antenna 100E according to the present embodiment has a structure similar to that of the multiband antenna 100 (see FIG. 1) of the aforementioned first embodiment. Accordingly, components of the multiband antenna 100E shown in FIG. 6 which are same as those of the multiband antenna 100 of the first embodiment are referred by using reference signs same as those of the multiband antenna 100 of the first embodiment. As for directions and orientations in the present embodiment, expressions same as those of the first embodiment will be used hereinbelow.

Referring to FIG. 6, the multiband antenna 100E of the present embodiment has a plurality of operating frequencies. The multiband antenna 100E extends long in the first direction.

As shown in FIG. 6, the multiband antenna 100E has a conductor main portion 200, a ground terminal 300E and a radiation element 400.

Referring to FIG. 6, the ground terminal 300E of the present embodiment is a copper tape. However, the present embodiment is not limited thereto. Specifically, the ground terminal 300E may be made of the metal plate 750E. The ground terminal 300E is connected to the host conductor when the multiband antenna 100E is used. The ground terminal 300E extends from a second long edge 240. The ground terminal 300E is positioned closer to a first short edge 210 than to a second short edge 220 in the first direction. Specifically, the ground terminal 300E is positioned closer to an opening 250 than to a midpoint MP of a slot 260 in the first direction. More specifically, the ground terminal 300E extends so as to be continuous with the first short edge 210. However, the present invention is not limited thereto. Specifically, the multiband antenna 100E should be configured so that the ground terminal 300E extends so as to be, at least in part, continuous with the first short edge 210. This configuration enables the multiband antenna 100E to have a low resonant frequency. This also means that, if the multiband antenna 100E with this configuration and a multiband antenna without this configuration have the same resonant frequency, the multiband antenna 100E with this configuration has a size smaller than a size of the multiband antenna without this configuration.

Referring to FIG. 6, the ground terminal 300E of the present embodiment has a part 310 extending in a direction which intersects with the horizontal plane. This enables the conductor main portion 200 to be arranged away from the host conductor when the multiband antenna 100E is connected to the host conductor. Accordingly, the conductor main portion 200 is less affected by the host conductor.

Where the second embodiment of the present invention is described above, the present embodiment may be modified as follows.

First Modification

Figure 7:
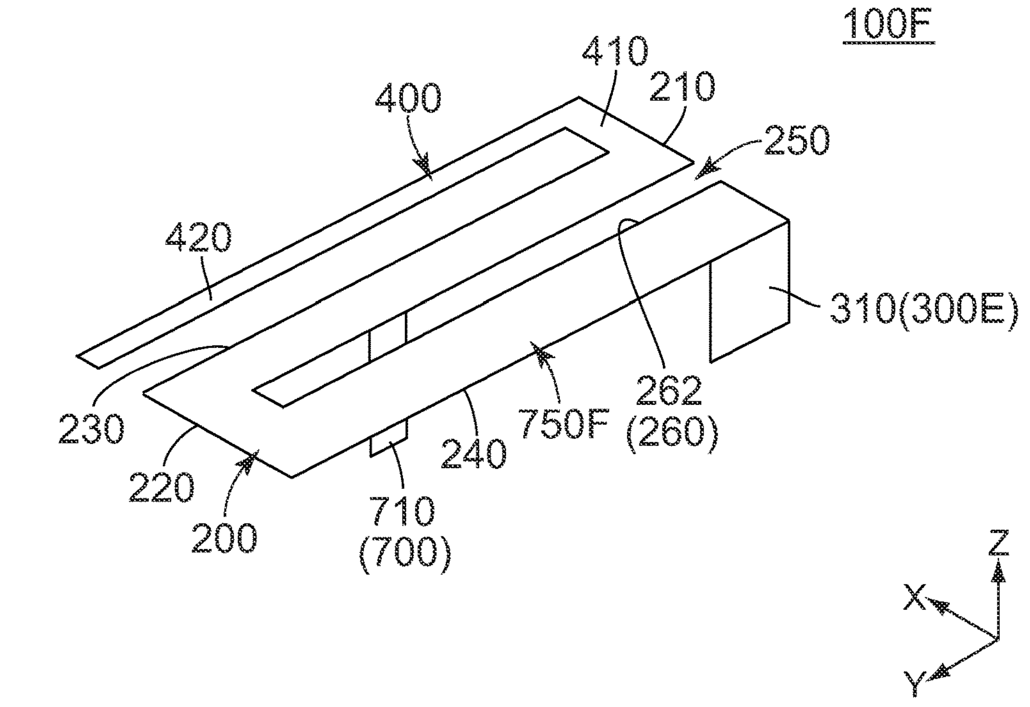
FIG. 7 is a perspective, schematic view showing a first modification of the multiband antenna of FIG. 6.

Referring to FIG. 7, a multiband antenna 100F according to a first modification is partially made of a metal plate 750F. The multiband antenna 100F of the present modification is connected to a host conductor (not shown) when used.

Referring to FIG. 7, the multiband antenna 100F has a plurality of operating frequencies. The multiband antenna 100F extends long in the first direction.

As shown in FIG. 7, the multiband antenna 100F of the present modification has a conductor main portion 200, a ground terminal 300E and a radiation element 400. The ground terminal 300E of the present modification has a structure same as that of the ground terminal 300E of the aforementioned second embodiment. Accordingly, a detailed explanation thereabout is omitted.

As shown in FIG. 7, the multiband antenna 100F further comprises a feed terminal 700. The feed terminal 700 has a part 710 extending in a direction which intersects with the horizontal plane. In detail, the feed terminal 700 extends in the perpendicular direction. Specifically, the feed terminal 700 extends downward in the up-down direction from the conductor main portion 200. Thus, the multiband antenna 100F is mountable on a surface of a circuit board (not shown).

Second Modification

Figure 8:
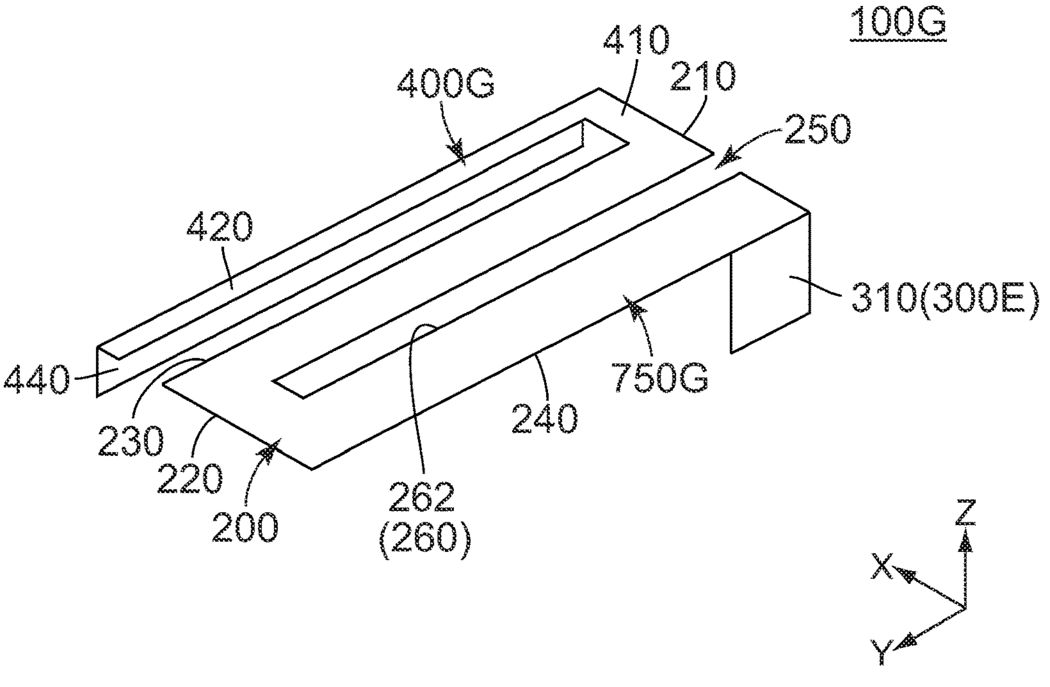
FIG. 8 is a perspective, schematic view showing a second modification of the multiband antenna of FIG. 6.

Referring to FIG. 8, a multiband antenna 100G according to a second modification is partially made of a metal plate 750G. However, the present invention is not limited thereto. Specifically, the whole of the multiband antenna 100G may be made of the metal plate 750G. The multiband antenna 100G of the present modification is connected to a host conductor (not shown) when used.

Referring to FIG. 8, the multiband antenna 100G has a plurality of operating frequencies. The multiband antenna 100 extends long in the first direction.

As shown in FIG. 8, the multiband antenna 100G of the present modification has a conductor main portion 200, a ground terminal 300E and a radiation element 400G. The ground terminal 300E of the present modification has a structure same as that of the ground terminal 300E of the aforementioned second modification. Accordingly, a detailed explanation thereabout is omitted.

Referring to FIG. 8, the radiation element 400G of the present modification is made of the metal plate 750G. An electrical length of the radiation element 400G is defined with reference to one-fourth of a wavelength of one of the operating frequencies of the multiband antenna 100G. In other words, the electrical length of the radiation element 400G corresponds to one-fourth of a wavelength of any one of the operating frequencies of the multiband antenna 100G. The radiation element 400G has a first portion 410, a second portion 420 and a folded portion 440.

As shown in FIG. 8, the folded portion 440 of the present modification extends from the second portion 420 in a direction which intersects with the horizontal plane. In detail, the folded portion 440 extends in the perpendicular direction from the second portion 420. Specifically, the folded portion 440 extends downward in the up-down direction from the second portion 420. Thus, the strength of the multiband antenna 100G can be increased, and the radiation efficiency of the multiband antenna 100G can be increased without increasing an occupied area of the multiband antenna 100G. However, the present invention is not limited thereto. Specifically, the folded portion 440 may extend upward in the up-down direction from the second portion 420. Also in this case, the strength of the multiband antenna 100G can be increased, the radiation efficiency of the multiband antenna 100G can be increased without increasing the occupied area of the multiband antenna 100G.

Third Modification

Figure 9:
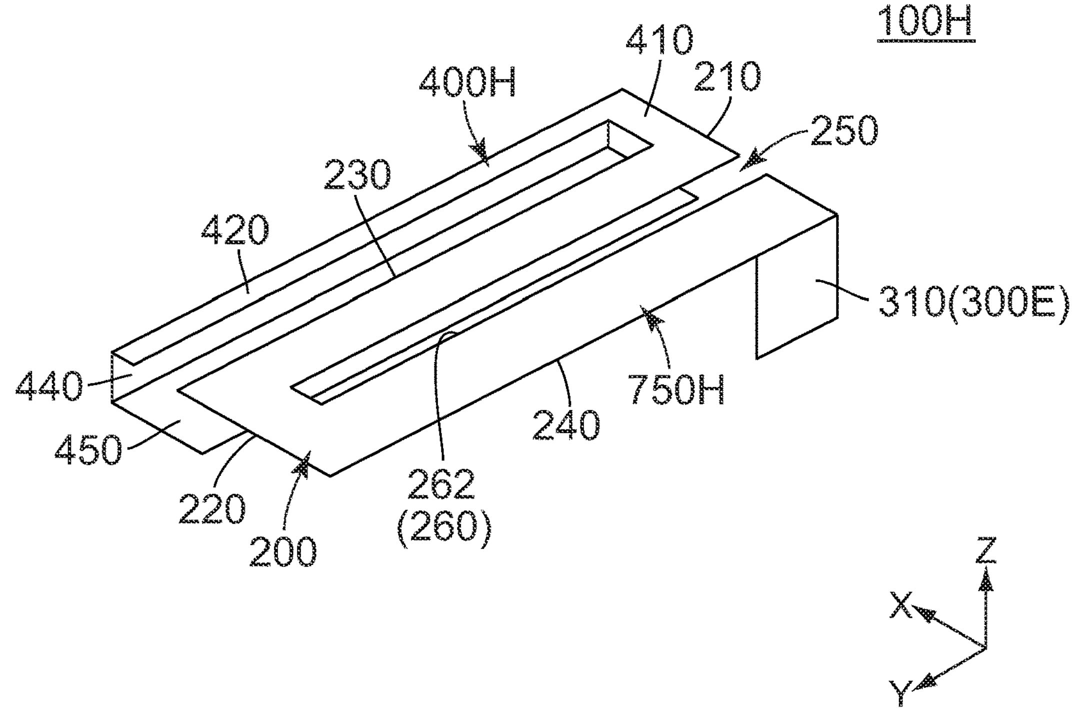
FIG. 9 is a perspective, schematic view showing a third modification of the multiband antenna of FIG. 6.

Referring to FIG. 9, a multiband antenna 100H according to a third modification is partially made of a metal plate 750H. However, the present invention is not limited thereto. Specifically, the whole of the multiband antenna 100H may be made of the metal plate 750H. The multiband antenna 100H of the present modification is connected to a host conductor (not shown) when used.

Referring to FIG. 9, the multiband antenna 100H has a plurality of operating frequencies. The multiband antenna 100H extends long in the first direction.

As shown in FIG. 9, the multiband antenna 100H of the present modification has a conductor main portion 200, a ground terminal 300E and a radiation element 400H. The ground terminal 300E of the present modification has a structure same as that of the ground terminal 300E of the aforementioned second embodiment. Accordingly, a detailed explanation thereabout is omitted.

Referring to FIG. 9, the radiation element 400H of the present modification is made of the metal plate 750H. An electrical length of the radiation element 400H is defined with reference to one-fourth of a wavelength of one of the operating frequencies of the multiband antenna 100H. In other words, the electrical length of the radiation element 400H corresponds to one-fourth of a wavelength of any one of the operating frequencies of the multiband antenna 100H. The radiation element 400H has a first portion 410, a second portion 420, a folded portion 440 and an additional extending portion 450. The folded portion 440 of the present modification has a structure same as that of the folded portion 440 of the aforementioned second modification. Accordingly, a detailed explanation thereabout is omitted.

As shown in FIG. 9, the additional extending portion 450 extends from the folded portion 440 in a direction which intersects with the folded portion 440. In detail, the additional extending portion 450 extends in the second direction from the folded portion 440. Specifically, the additional extending portion 450 extends rearward in the front-rear direction from the folded portion 440. Thus, the strength of the multiband antenna 100H can be increased, and the radiation efficiency of the multiband antenna 100H can be increased without increasing an occupied area of the multiband antenna 100H.

Fourth Modification

Figure 10:
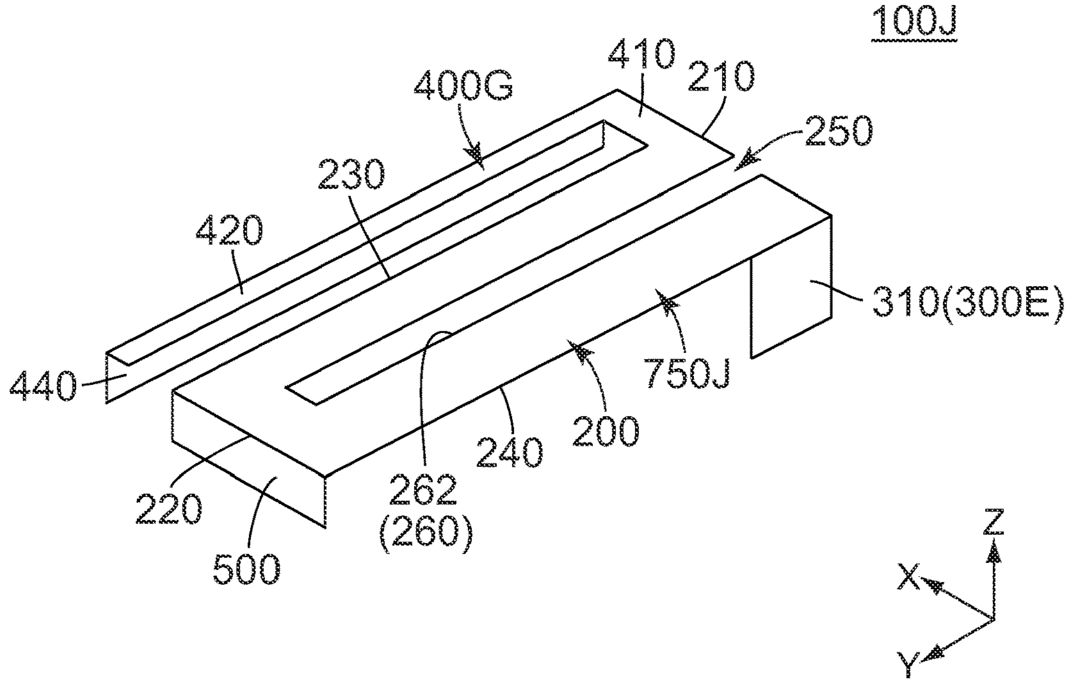
FIG. 10 is a perspective, schematic view showing a fourth modification of the multiband antenna of FIG. 6.

Referring to FIG. 10, a multiband antenna 100J according to a fourth modification is partially made of a metal plate 750J. However, the present invention is not limited thereto. Specifically, the whole of the multiband antenna 100J may be made of the metal plate 750J. The multiband antenna 100J of the present modification is connected to a host conductor (not shown) when used.

Referring to FIG. 10, the multiband antenna 100J has a plurality of operating frequencies. The multiband antenna 100J extends long in the first direction.

As shown in FIG. 10, the multiband antenna 100J of the present modification has a conductor main portion 200, a ground terminal 300E and a radiation element 400G. The ground terminal 300E of the present modification has a structure same as that of the ground terminal 300E of the aforementioned second embodiment. Accordingly, a detailed explanation thereabout is omitted. The radiation element 400G of the present modification has a structure same as that of the radiation element 400G of the aforementioned second modification. Accordingly, a detailed explanation thereabout is omitted.

As shown in FIG. 10, the multiband antenna 100J further has an extending portion 500. The extending portion 500 extends from the conductor main portion 200 in a direction which intersects with the horizontal plane. In detail, the extending portion 500 extends from a second short edge 220 of the conductor main portion 200 in the perpendicular direction. Specifically, the extending portion 500 extends downward in the up-down direction from the second short edge 220 of the conductor main portion 200. Thus, the strength of the multiband antenna 100J can be increased strength, and the radiation efficiency of the multiband antenna 100J can be increased without increasing an occupied area of the multiband antenna 100J.

Fifth Modification

Figure 11:
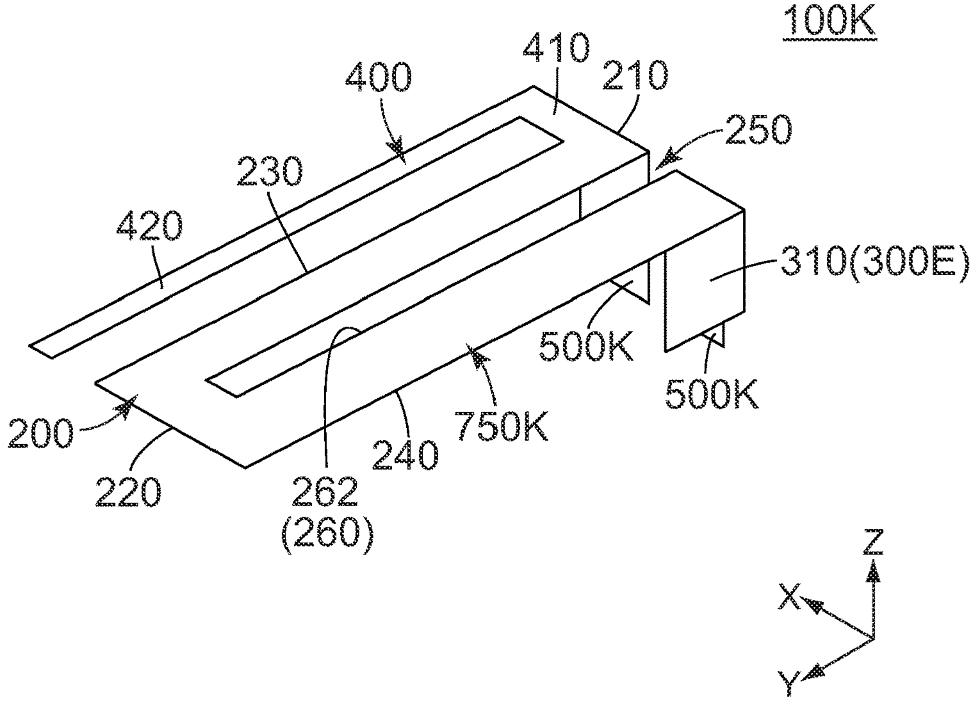
FIG. 11 is a perspective, schematic view showing a fifth modification of the multiband antenna of FIG. 6.

Referring to FIG. 11, a multiband antenna 100K according to a fifth modification of the present invention is partially made of a metal plate 750K. However, the present invention is not limited thereto. Specifically, the whole of the multiband antenna 100K may be made of the metal plate 750K. The multiband antenna 100K of the present modification is connected to a host conductor (not shown) when used.

Referring to FIG. 11, the multiband antenna 100K has a plurality of operating frequencies. The multiband antenna 100K extends long in the first direction.

As shown in FIG. 11, the multiband antenna 100K of the present modification has a conductor main portion 200, a ground terminal 300E and a radiation element 400. The ground terminal 300E of the present modification has a structure same as that of the ground terminal 300E of the aforementioned second embodiment. Accordingly, a detailed explanation thereabout is omitted.

As shown in FIG. 11, the multiband antenna 100K further comprises two extending portions 500K. Each of the extending portions 500K extends from the conductor main portion 200 in a direction which intersects with the horizontal plane. In detail, each of the extending portions 500K extends in the perpendicular direction from a first short edge 210 of the conductor main portion 200. Specifically, each of the extending portions 500K extends downward in the up-down direction from the first short edge 210 of the conductor main portion 200. Thus, the strength of the multiband antenna 100K can be increased, and the radiation efficiency of the multiband antenna 100K can be increased without increasing an occupied area of the multiband antenna 100K.

Sixth Modification

Figure 12:
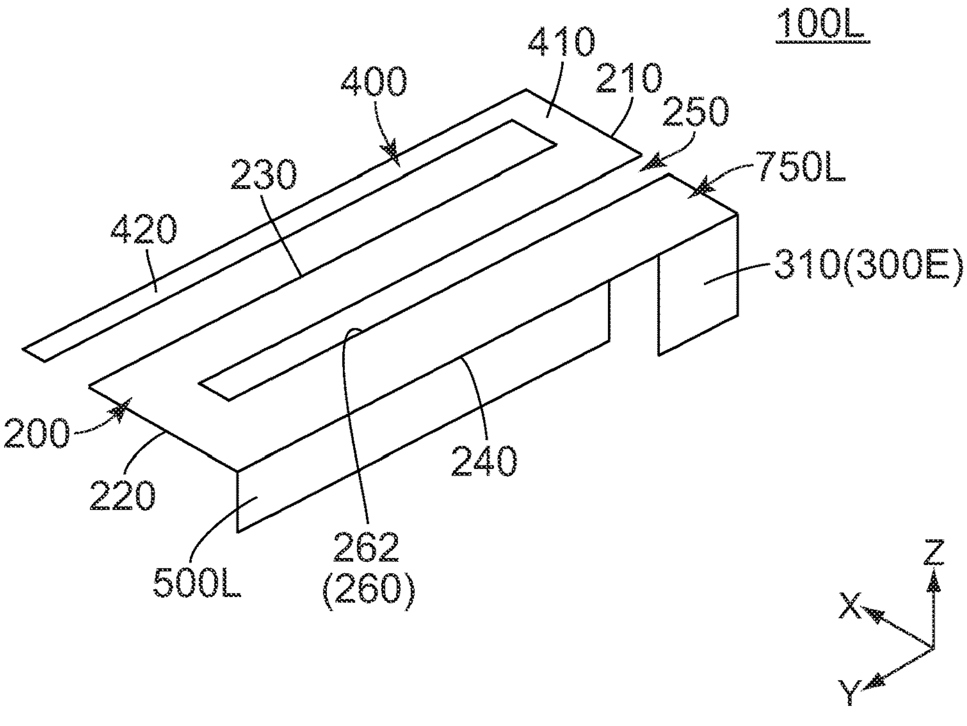
FIG. 12 is a perspective, schematic view showing a sixth modification of the multiband antenna of FIG. 6.

Referring to FIG. 12, a multiband antenna 100L according to a sixth modification is partially made of a metal plate 750L. However, the present invention is not limited thereto. Specifically, the whole of the multiband antenna 100L may be made of the metal plate 750L. The multiband antenna 100L of the present modification is connected to a host conductor (not shown) when used.

Referring to FIG. 12, the multiband antenna 100L has a plurality of operating frequencies. The multiband antenna 100L extends long in the first direction.

As shown in FIG. 12, the multiband antenna 100L of the present modification has a conductor main portion 200, a ground terminal 300E and a radiation element 400. The ground terminal 300E of the present modification has a structure same as that of the ground terminal 300E of the aforementioned second embodiment. Accordingly, a detailed explanation thereabout is omitted.

As shown in FIG. 12, the multiband antenna 100L further has an extending portion 500L. The extending portion 500L extends from the conductor main portion 200 in a direction which intersects with the horizontal plane. In detail, the extending portion 500L extends in the perpendicular direction from a second long edge 240 of the conductor main portion 200. Specifically, the extending portion 500L extends downward in the up-down direction from the second long edge 240 of the conductor main portion 200. Thus, the strength of the multiband antenna 100L can be increased, and the radiation efficiency of the multiband antenna 100L can be increased without increasing an occupied area of the multiband antenna 100L.

Seventh Modification

Figure 13:
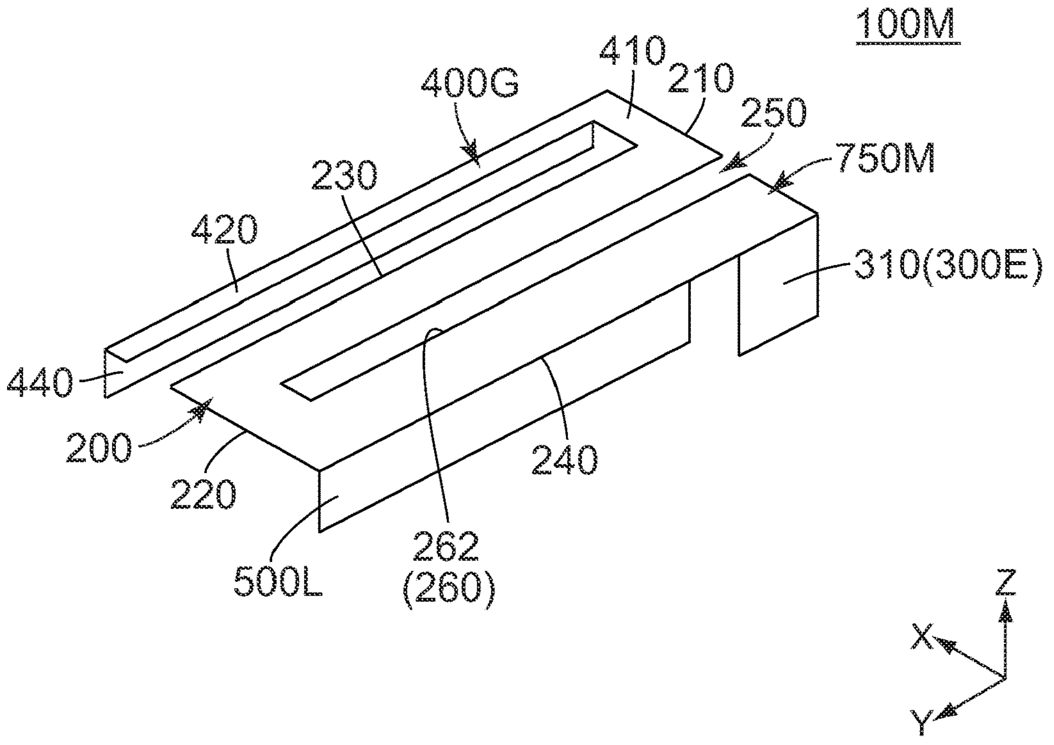
FIG. 13 is a perspective, schematic view showing a seventh modification of the multiband antenna of FIG. 6.

Referring to FIG. 13, a multiband antenna 100M according to a seventh modification is partially made of a metal plate 750M. However, the present invention is not limited thereto. Specifically, the whole of the multiband antenna 100M may be made of the metal plate 750M. The multiband antenna 100M of the present modification is connected to a host conductor (not shown) when used.

Referring to FIG. 13, the multiband antenna 100M has a plurality of operating frequencies. The multiband antenna 100M extends long in the first direction.

As shown in FIG. 13, the multiband antenna 100M of the present modification has a conductor main portion 200, a ground terminal 300E and a radiation element 400G. The ground terminal 300E of the present modification has a structure same as that of the ground terminal 300E of the aforementioned second embodiment. Accordingly, a detailed explanation thereabout is omitted. The radiation element 400G of the present modification has a structure same as that of the radiation element 400G of the aforementioned second modification. Accordingly, a detailed explanation thereabout is omitted.

As shown in FIG. 13, the multiband antenna 100M further comprises an extending portion 500L. The extending portion 500L of the present modification has a structure same as that of the extending portion 500L of the aforementioned sixth modification.

Since the multiband antenna 100M of the present modification further comprises the folded portion 440 and the extending portion 500L, the strength of the multiband antenna 100M can be further increased, and the radiation efficiency of the multiband antenna 100M can be increased without increasing an occupied area of the multiband antenna 100M.

Eighth Modification

Figure 14:
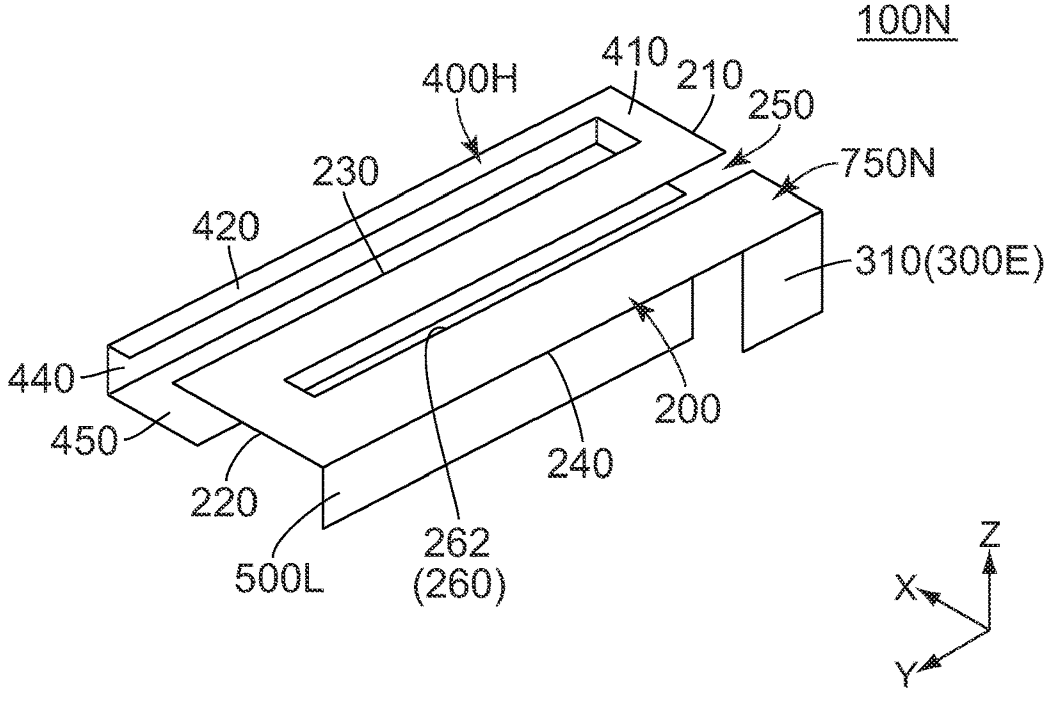
FIG. 14 is a perspective, schematic view showing an eighth modification of the multiband antenna of FIG. 6.

Referring to FIG. 14, a multiband antenna 100N according to an eighth modification is partially made of a metal plate 750N. However, the present invention is not limited thereto. Specifically, the whole of the multiband antenna 100N may be made of the metal plate 750N. The multiband antenna 100N of the present modification is connected to a host conductor (not shown) when used.

Referring to FIG. 14, the multiband antenna 100N has a plurality of operating frequencies. The multiband antenna 100N extends long in the first direction.

As shown in FIG. 14, the multiband antenna 100N of the present modification has a conductor main portion 200, a ground terminal 300E and a radiation element 400H. The ground terminal 300E of the present modification has a structure same as that of the ground terminal 300E of the aforementioned second embodiment. Accordingly, a detailed explanation thereabout is omitted. The radiation element 400H of the present modification has a structure same as that of the radiation element 400H of the aforementioned third modification. Accordingly, a detailed explanation thereabout is omitted.

As shown in FIG. 14, the multiband antenna 100N further comprises an extending portion 500L. The extending portion 500L of the present modification has a structure same as that of the extending portion 500L of the aforementioned sixth modification.

Since the multiband antenna 100N of the present modification further comprises a folded portion 440, an additional extending portion 450 and the extending portion 500L, the strength of the multiband antenna 100N can be further increased, and the radiation efficiency of the multiband antenna 100N can be increased without increasing an occupied area of the multiband antenna 100N.

Ninth Modification

Figure 15:
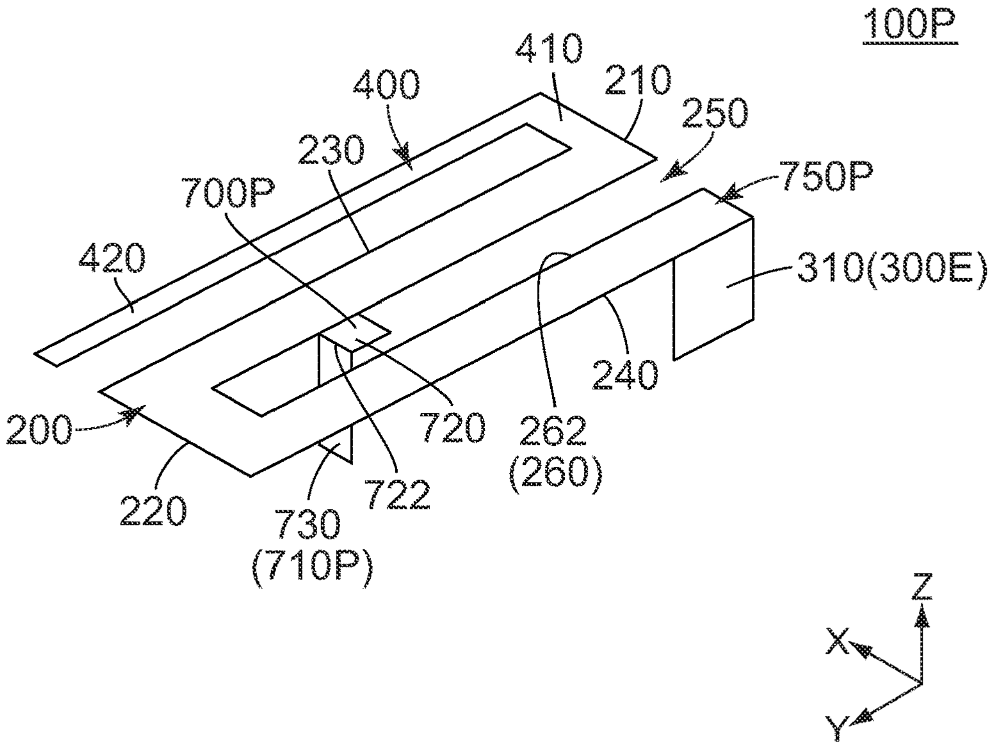
FIG. 15 is a perspective, schematic view showing a ninth modification of the multiband antenna of FIG. 6.

Referring to FIG. 15, a multiband antenna 100P according to a ninth modification of the present invention is partially made of a metal plate 750P. However, the present invention is not limited thereto. Specifically, the whole of the multiband antenna 100P may be made of the metal plate 750P. The multiband antenna 100P of the present modification is connected to a host conductor (not shown) when used.

Referring to FIG. 15, the multiband antenna 100P has a plurality of operating frequencies. The multiband antenna 100P extends long in the first direction.

As shown in FIG. 15, the multiband antenna 100P of the present modification has a conductor main portion 200, a ground terminal 300E and a radiation element 400. The ground terminal 300E of the present modification has a structure same as that of the ground terminal 300E of the aforementioned second embodiment. Accordingly, a detailed explanation thereabout is omitted.

As shown in FIG. 15, the multiband antenna 100P further comprises a feed terminal 700P. The feed terminal 700P is made of the metal plate 750P. The feed terminal 700P has a part 710P extending in a direction which intersects with the horizontal plane. In detail, the feed terminal 700P extends in the perpendicular direction. Specifically, the feed terminal 700P extends downward in the up-down direction from the conductor main portion 200. Thus, the multiband antenna 100P is mountable on a surface of a circuit board (not shown).

Referring to FIG. 15, the multiband antenna 100P is configured so that a set of the conductor main portion 200, the radiation element 400 and the feed terminal 700P is made of the single metal plate 750P. However, the present invention is not limited thereto. Specifically, the multiband antenna 100P should be configured so that at least the conductor main portion 200 and the feed terminal 700P are made of the metal plate 750P.

As shown in FIG. 15, the feed terminal 700P of the present modification has a protruding portion 720 and a junction 730.

As shown in FIG. 15, the protruding portion 720 of the present modification has a flat-plate shape perpendicular to the perpendicular direction. The protruding portion 720 protrudes in a slot 260 from an inner edge 262 of the slot 260. More specifically, the protruding portion 720 protrudes rearward in the slot 260 from the inner edge 262 which is positioned at a front side of the slot 260. The protruding portion 720 has an end 722 in the first direction. Specifically, the protruding portion 720 has a right end 722 in the right-left direction.

As shown in FIG. 15, the junction 730 of the present modification has a flat-plate shape perpendicular to the first direction. The junction 730 extends from the end 722 of the protruding portion 720 in a direction which intersects with the horizontal plane. More specifically, the junction 730 extends downward in the up-down direction from the right end 722 of the protruding portion 720. The junction 730 also functions as the part 710P extending in the direction which intersects with the horizontal plane.

Referring to FIG. 15, the aforementioned configuration of the feed terminal 700P enables the junction 730 to have a relatively large length when a set of the conductor main portion 200 and the feed terminal 700P is formed of the single metal plate 750P.

Although the specific explanation about the present invention is made above referring to the embodiments, the present invention is not limited thereto and is susceptible to various modifications and alternative forms.

Although the feed terminals 700, 700P of the aforementioned modifications have the parts 710, 710P each extending in the direction which intersects with the horizontal plane, the present invention is not limited thereto. Specifically, the feed terminal 700 may not have the part 710 extending in the direction which intersects with the horizontal plane. Similarly, the feed terminal 700P may not have the part 710P extending in the direction which intersects with the horizontal plane. In other words, the feed terminal 700, 700P may consist of only a part extending in the horizontal plane. A multiband antenna 100F, 100P, whose feed terminal 700, 700P consists of only the part extending in the horizontal plane, may be provided with a ground connection portion which is positioned around the feed terminal 700, 700P and is aligned with the feed terminal 700, 700P in the first direction. This enables that, when a center conductor (not shown) of a coaxial cable (not shown) is connected to the feed terminal 700, 700P of the multiband antenna 100F, 100P, an outer conductor (not shown) of the coaxial cable can be connected to the ground connection portion together with the connection of the center conductor to the feed terminal 700, 700P.

Figure 16:
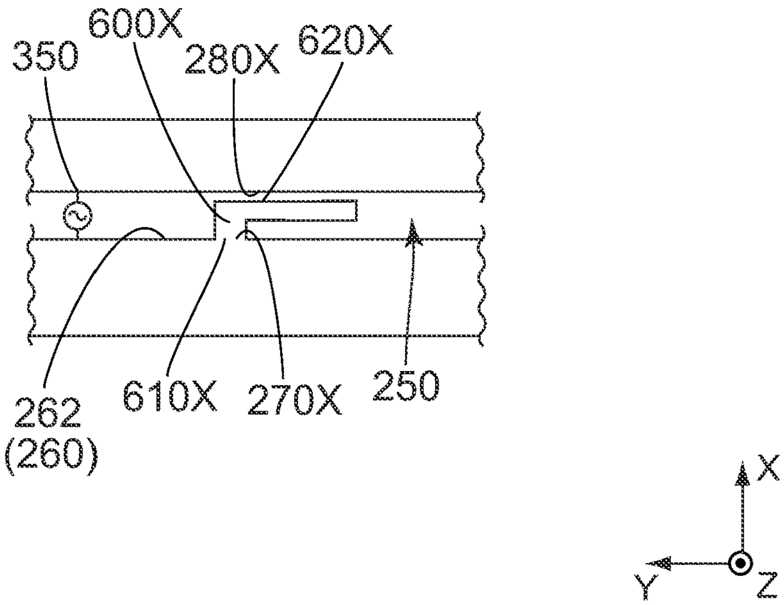
FIG. 16 is a view showing a modification of a stub.
Figure 17:
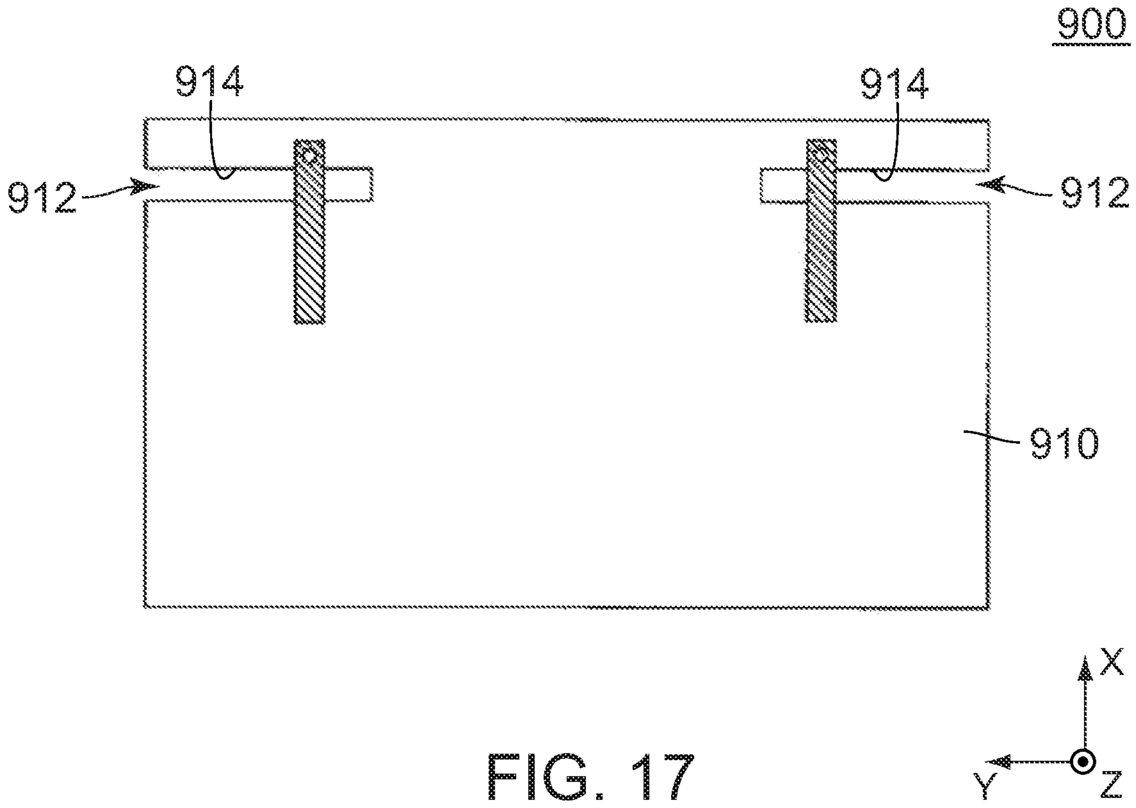
FIG. 17 PRIOR ART
FIG. 17 is a top view showing a multiband antenna of Patent Document 1.

In the aforementioned first embodiment, the multiband antenna 100B (see FIG. 3) of the second modification comprises the stub 600B, the multiband antenna 100C (see FIG. 4) of the third modification comprises the stub 600C and the multiband antenna 100D (see FIG. 5) of the fourth modification comprises the stub 600D. However, the present invention is not limited thereto. Referring to FIG. 16, instead of the stub 600B, 600C, 100D, the multiband antenna 1008, 100C, 100D may comprise a stub 600X which extends in the second direction and is bent to extend in the first direction. Specifically, a first end 610X of the stub 600X is connected with a connection portion 270X, and a second end 620X of the stub 600X is spaced apart from an opposed portion 280X and faces the opposed portion 280X.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A multiband antenna which is connected to a host conductor when used, a direction along which a longest side of the multiband antenna extends corresponding to a first direction, and the multiband antenna comprising:

a conductor main portion;

a ground terminal;

a feed point; and a radiation element, wherein:

the conductor main portion extends in a horizontal plane which is defined by the first direction and a second direction perpendicular to the first direction;

an opening and a slot are provided in the conductor main portion;

a long side of the slot extends in the first direction;

the conductor main portion has a first short edge, a second short edge, a first long edge, and a second long edge;

the first short edge and the second short edge are positioned at respective opposite ends of the conductor main portion in the first direction;

the first long edge and the second long edge are positioned at respective opposite ends of the conductor main portion in the second direction;

the opening is provided at the first short edge and connects the slot with an outside of the conductor main portion in the first direction;

the ground terminal is connected to the host conductor when the multiband antenna is used;

the ground terminal extends from the second long edge;

the ground terminal is positioned closer to the first short edge than to the second short edge in the first direction;

the feed point is positioned closer to the second short edge than to the first short edge in the first direction;

the radiation element has a first portion and a second portion;

the first portion extends from the conductor main portion so as to be apart from the slot in the second direction;

the first portion has a first length in the second direction;

the second portion extends in the first direction from the first portion;

the second portion has a second length in the first direction;

the second length is greater than the first length; and the first portion is positioned closer to the first short edge than to the second short edge in the first direction.

2. The multiband antenna as recited in claim 1, wherein the ground terminal extends so as to be, at least in part, continuous with the first short edge.

3. The multiband antenna as recited in claim 1, wherein:

the radiation element further has a folded portion; and the folded portion extends from the second portion in a direction which intersects with the horizontal plane.

4. The multiband antenna as recited in claim 3, wherein:

the radiation element further has an additional extending portion; and the additional extending portion extends from the folded portion in a direction which intersects with the folded portion.

5. The multiband antenna as recited in claim 1, wherein:

the multiband antenna further comprises a stub;

the conductor main portion has a connection portion and an opposed portion;

the connection portion and the opposed portion are positioned so that the slot is between the connection portion and the opposed portion in the second direction;

the stub has a first end and a second end in the second direction;

the first end of the stub is connected with the connection portion; and the second end of the stub is spaced apart from the opposed portion and faces the opposed portion.

6. The multiband antenna as recited in claim 1, wherein the ground terminal has a part extending in a direction which intersects with the horizontal plane.

7. The multiband antenna as recited in claim 6, wherein:

the multiband antenna further has a feed terminal; and the feed terminal has a part extending in a direction which intersects with the horizontal plane.

8. The multiband antenna as recited in claim 7, wherein:

the multiband antenna is configured so that at least the conductor main portion and the feed terminal are made of a metal plate;

the feed terminal has a protruding portion and a junction;

the protruding portion protrudes in the slot from an inner edge of the slot;

the protruding portion has an end in the first direction; and the junction extends from the end of the protruding portion in a direction which intersects with the horizontal plane.

9. The multiband antenna as recited in claim 1, wherein:

the multiband antenna further has an extending portion; and the extending portion extends from the conductor main portion in a direction which intersects with the horizontal plane.

10. The multiband antenna as recited in claim 1, wherein the radiation element works as an unpowered antenna.

* * * * *